United States Patent
Boussu et al.

(10) Patent No.: US 6,749,704 B2
(45) Date of Patent: Jun. 15, 2004

(54) PROCESS FOR ULTRASONIC BONDING

(75) Inventors: Maxime Boussu, Saint Lyphard (FR); Eric Rambaud, Les Sorinieres (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/395,229

(22) Filed: Mar. 25, 2003

(65) Prior Publication Data

US 2003/0178123 A1 Sep. 25, 2003

(30) Foreign Application Priority Data

Mar. 25, 2002 (FR) .............................. 02 03680

(51) Int. Cl.⁷ .............................................. B32B 31/16
(52) U.S. Cl. .................... 156/64; 156/73.1; 156/73.5
(58) Field of Search ................. 156/64, 73.1, 73.5, 156/308.2, 358, 359, 580.1, 580.2

(56) References Cited

U.S. PATENT DOCUMENTS

| 5,435,863 A | * | 7/1995 | Frantz ......................... 156/64 |
| 5,658,408 A | * | 8/1997 | Frantz et al. .................. 156/64 |
| 5,846,377 A | * | 12/1998 | Frantz et al. ................ 156/359 |
| 5,855,706 A | * | 1/1999 | Grewell ........................ 156/64 |
| 6,036,796 A | * | 3/2000 | Halbert et al. ................. 156/64 |
| 6,544,364 B2 | * | 4/2003 | Maeda et al. .................. 156/64 |

* cited by examiner

Primary Examiner—James Sells
(74) Attorney, Agent, or Firm—Young & Thompson

(57) ABSTRACT

A process for bonding at least two elements (10, 12) of which at least one is impregnated with a thermostable thermoplastic resin or mixtures of resins, characterized in that the elements are placed in contact by pressure members which are adapted also to transmit vibrations to at least one of the elements so as to obtain temperature rise by friction at the interface, to the operating temperature comprised within a shoulder (20), comprising a less rapid increase of shoulder corresponding to the passage from the solid to the liquid condition of the resin or of the mixture of resins.

13 Claims, 1 Drawing Sheet

PROCESS FOR ULTRASONIC BONDING

The present invention relates to a process for ultrasonic bonding, more particularly adapted for the assembly of elements at least one of which is impregnated with a resin.

Bonding techniques are widely used in the field of composites, particularly in the processes for production of acoustically absorptive panels, and more particularly in the production of resistive layers.

According to the teaching of French patent application FR-01.08036 in the name of the applicant, a resistive layer comprises a first acoustically damping element in the form of a porous surface, for example of an acoustic metallic cloth and at least one second structurally reinforcing element in the form for example of fibers pre-impregnated with a thermosetting or thermoplastic resin or a mixture of resins. Generally, the resistive layer is made from multi-layer strips comprising acoustically damping elements and structural reinforcement.

The connection by bonding using one or several resins must guarantee not only a solid mechanical connection between the different elements, but also keep the quantity of opening of the acoustically damping element in the present case.

To obtain optimum mechanical properties, the connection by bonding must be carried out at a suitable temperature and pressure as a function of the resin used.

One of the techniques used to carry out this bonding consists in using a nitrogen torch blowing hot nitrogen to supply the quantity of heat necessary to use the resin and a pressure roller to apply pressure on the layers for using the resin.

This technique is not satisfactory for the following reasons.

First of all, the heating and pressure localities are offset, which necessarily leads to cooling of the resin, such that at the moment of its use, during pressure, the latter is not at the required temperature, inevitably changing the characteristics of adhesion and hence the quality of the connection. To compensate for this cooling due to offset, it has been practiced to superheat the material at the risk of burning the elements or the resin and making it lose its adhesive properties.

Then, heating is carried out in a surface manner, such that it is necessary to overheat the material of one of the layer so as to obtain good heat penetration.

Finally, given the numerous parameters involved, the monitoring of the heating temperature of the resin is almost impossible, so that it is very difficult to obtain a constant and reproducible quality of bond. Also, this technique cannot be used for industrial type fabrication, particularly to ensure the connection of strips together when these latter are disposed on a mold.

Also, the present invention seeks to overcome the drawbacks of the prior art by providing a bonding process for at least two elements of which at least one is impregnated with a resin or a mixture of resins, permitting optimum use of the resin in a reproducible manner, while limiting the risk of change by overheating of the materials of the connected layers but also the resin, said use being adapted easily to be integrated into an industrial process.

To this end, the invention has for its object a process for bonding at least two elements of which at least one is impregnated with a resin or a mixture of thermostable thermoplastic resins, characterized in that the elements are placed in contact by pressure means which are also adapted to transmit vibrations to at least one of the elements so as to obtain a temperature rise by friction at the interface, to the operating temperature comprised at a shoulder, resulting in a less rapid increase of temperature, corresponding to passage from the solid state to the liquid state of the resin or of the mixture of resins.

Preferably, when one of the elements has openings, the operating temperature is selected at the beginning of the shoulder.

According to another characteristic, to bond several elements using several types of resins or mixtures of resins, it is preferable to carry out the bonding in several steps as a function of the number of types of resins or mixtures of resins, so as to adjust the operating temperature to each type.

According to a preferred embodiment, the pressure means for transmitting vibrations comprise a sonotrode head which is adapted to transit vibrations and an adjustable pressure force and to press the elements against a support element.

As a function of the use, the elements to be bonded move below the sonotrode head so that this latter moves relative to said elements.

Other characteristics and advantages will become apparent from the description which follows of the invention, which description is given solely by way of example, with respect to the accompanying drawings, in which.

An acoustic panel generally comprises at least one resistive layer more or less permeable to air, combined with at least one cellular structure of the honeycomb type, the assembly being connected to a total reflector.

The resistive layer is generally present in the form of juxtaposed strips and generally comprises a first acoustic damping constituent in the form for example of a metallic acoustic cloth, and at least one second structurally reinforcing element in the form for example of fibers pre-impregnated with a thermosetting or thermoplastic resin or with a mixture of resins.

The acoustic damping constituent is preferably constituted by a stainless steel grill cloth of the type of those sold under the mark GANTOIS.

Preferably, the reinforcing constituent is constituted by fibers for example of carbon, glass or KEVLAR®, in the form of fibers, meshes, tresses or strands of filaments of variable cross-section.

To ensure connection between these two constituents, use is made of a resin or a mixture of resins. The resin or resins are preferably thermostable thermoplastic resins, such as that of the families of polyetherimides (PET), polyetheretherketones (PEEK), polyphenylenesulfones (PPS), polyamides (PA) and polyethyleneterephthalate (PET).

In what follows, by resin is meant a resin or mixture of resins.

According to the invention, at least one of the two constituents is pre-impregnated with resin by using any suitable method, such as by dipping for example. Preferably, the fibers of composite material are pre-impregnated.

Figure 1:
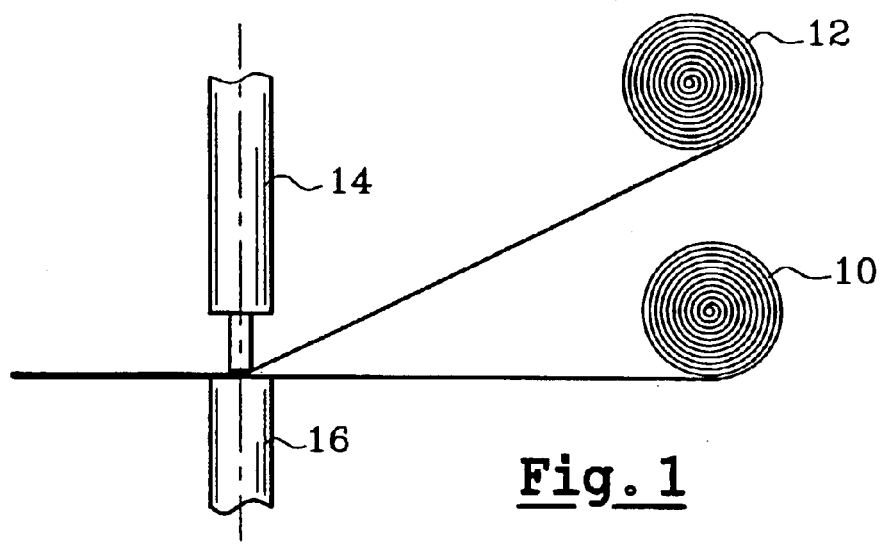
FIG. 1 is a schematic of the process of the invention.

Prior to the bonding step, for easier storage and use, the acoustic damping constituent and structural reinforcing constituent are present in the form of rolled up strips, respectively 10 and 12, shown in FIG. 1 on spools.

For the operation of bonding properly so called, the two strips 10 and 12 are placed in contact with pressure means which are adapted also to transmit vibrations to at least one of the two strips 10 or 12.

According to one embodiment, these pressure and vibration transmission means comprise a sonotrode head 14 which is adapted to transmit vibrations and adjustable pressure force to press the strips 10 and 12 against each other, on the background of an anvil 16.

The frequency of the vibrations is determined by those skilled in the art as a function particularly of the size of the sonotrode, of the required power, of the thickness of the products to be heated and of their nature.

The vibrations transmitted to the strips generate two heating phenomena, a volumetric heating thanks to molecular agitation, and an interfacial heating between the two strips produced by friction.

By way of example, in the case of a PEI resin, the volumetric heating absorbs 10 to 15% of the heating power, the rest serving for temperature elevation at the interface.

Thus, according to the process of the invention, there will be noticed a sharp and rapid temperature elevation at the interface between the two strips, which permits setting the temperature of the resin at this level.

In the case of the use of a thermoplastic resin, the temperature elevation at the interface permits modifying the condition of said resin, which passes from a solid state to a viscous or liquid state corresponding to its use condition.

The operating temperature of the resin being always less than the melting temperature of the elements to be placed in contact, it will be noted that this technical solution prevents any risk of alteration of the elements in contact with each other by overheating. Thus, the volumetric heating being very low relative to the interfacial heating, the temperature elevation is perfectly localized at the place where the resin is used, the elements to be assembled being subjected only to a small temperature elevation, in all cases less than the operating temperature of the resin and hence below their fusion temperature.

By way of example, the operating temperature for a PEI resin is of the order of 300° C. and for a PEEK resin of the order of 400° C.

Moreover, the sonotrode transmitting both vibrations and pressure force, there is no offset between heating and application of pressure, which permits optimum use of the resin. Thus, it is no longer necessary to overheat the resin to obtain an ideal operating temperature during pressing, which is the case when this force is offset relative to heating.

According to another advantage of the invention, this bonding process can be used in situ during production of the acoustic panel and more particularly during emplacement of the strips, the walls of the mold or any other solid element, for example the honeycomb, being adapted to constitute a support element in the manner of an anvil. In this case, the sonotrode head is adapted to move and to apply during its movement the pressure force and the vibrations.

According to another characteristic of the invention, the bonding process also permits a natural regulation of the temperature.

Figure 2:
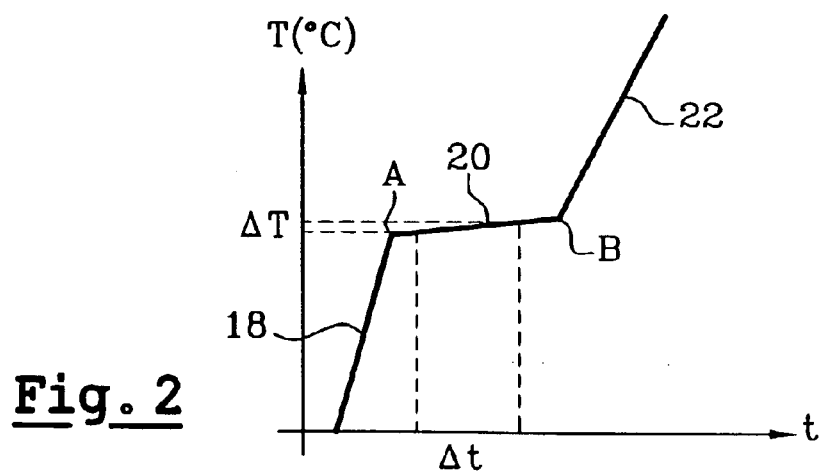
FIG. 2 is a curve of temperature rise according to the process of the invention.

Thus, when the materials in contact are in solid state, there will be seen a rapid temperature elevation, corresponding to the portion 18 of the curve of FIG. 2, showing temperature rise at the interface as a function of time.

When the resin passes from the solid state to the viscous or liquid state, it acts like a lubricant between the two strips, which translates into a less rapid temperature rise, corresponding to the shoulder 20. If heating is continued, the resin can vaporize or at least become too liquid and fluent during pressing, so that the heating by friction resumes, no element being any longer present, which translates into a sharp temperature rise corresponding to the portion 22.

Figure 3:
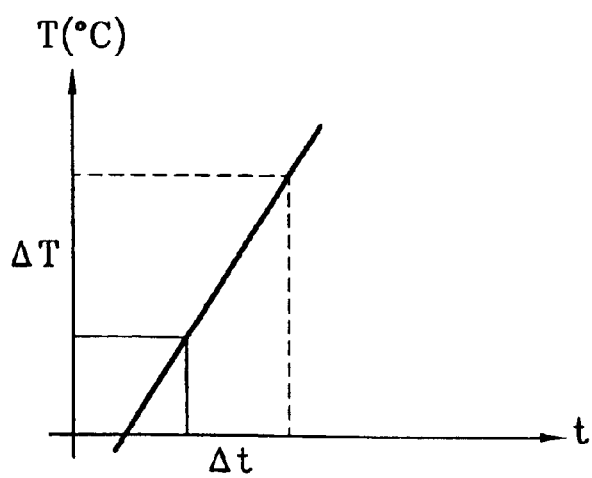
FIG. 3 is a curve of temperature rise according to a process of the prior art.

As can be seen in FIG. 3, the other heating techniques for using the resin do not permit having this adjustment shoulder, the temperature increase being substantially linear, so that it is very difficult to regulate this parameter.

Thus, it will be noted that according to the process, for a duration t, the temperature rise T is very low contrary to the process of the prior art for which there will be seen a sharp temperature rise T over the same time.

In the case of continuous bonding, as shown in FIG. 1, the quantity of energy supplied, which corresponds substantially to the temperature rise of the resin, depends on the one hand on the power delivered by the sonotrode which delivers a quantity of heat per unit time, and on the other hand on the speed of movement of the strips or a movement of the head of the sonotrode. Even if the sonotrode delivers a substantially constant power over time, the speed of movement on the contrary can be caused to vary during the process.

Also, thanks to the presence of this shoulder, even if the parameters, particularly the speed, are not stable over time, the fluctuations result in only a small variation in the quantity of energy supplied or of the temperature rise, such that the conditions of bonding, namely the pressure and temperature, are substantially constant, permitting obtaining a quality of bonding and hence substantially constant mechanical qualities, permitting easy industrialization of the process.

It is important to note that the process also comprises an initial phase of rapid temperature rise such as in the processes of the prior art, which contributes to obtaining a production speed of the same magnitude as the processes of the prior art.

The invention also has for its object a process for simple adjustment of the parameters used during the bonding process.

This adjustment process consists in delimiting the shoulder by testing, which is to say defining the points A and B at the beginning and end of the shoulder and regulating the operating temperature of the resin comprised within this shoulder by adjusting the parameters of the sonotrode and the speed of movement. The device for practicing the process is thus adjusted so as not to exceed the temperature corresponding to the temperature of alteration of the resin.

The process is thus reliable, repeatable and industrially applicable.

When one of the bonded elements has openings, for example a grill cloth, it is important to preserve the quantity of opening. To this end, it is preferable to select adjustment parameters permitting obtaining a temperature near the beginning of the shoulder A, corresponding to a high viscosity of the resin, to avoid the latter flowing and closing the openings.

According to another characteristic of the invention, the process of the invention can be used to assemble several elements or layers together in a single step. However, when the assembly comprises different resins, it is preferable to carry out the assembly in several steps so as to adjust the parameters of the process to the resin, so as not to burn the resin having the lowest melting temperature.

To assemble more than two layers, there can be used several sonotrodes disposed so as to form a series, the supply means for the layer permitting each sonotrode to be applied to at least one supplemental layer.

By way of example, for the production of a resistive layer comprising an acoustic damping constituent in the form of a metallic grill cloth reinforced on each of its surfaces with a strip of carbon of which one is impregnated with PEI resin and the other with PEEK resin, first there is bonded a first surface of the metallic grill cloth to the strip of carbon impregnated with PEEK resin. Then, on the second surface of the metallic grill cloth, there is bonded the other strip of carbon impregnated with PEI. The PEEK having an operating temperature higher than the PEI, it is preferable first to bond the strip impregnated with PEEK so as not to un-bond the strip impregnated with PEI.

Of course, the invention is clearly not limited to the embodiment shown and described above, but on the contrary covers all modifications, particularly as to the nature of the layers bonded together.

Finally, this process can also be used for bonding layers or elements to form both a strip for the bonding of mono-constituent strips or multi-constituent strips together.

What is claimed is:

1. Process for bonding at least two elements (10, 12) of which at least one is impregnated with at least one thermo-stable thermoplastic resin or mixture of resins, characterized in that it comprises at least:
   a step of placing in contact the elements by pressure means;
   a step of transmitting vibrations to at least one of the elements by said pressure means;
   a step of raising the temperature by friction to an operating temperature;
   a step of holding the operating temperature on a shoulder corresponding to the passage from solid state to liquid state of the resin or mixture of resins.

2. Bonding process for at least two elements of which one comprises openings according to claim 1, characterized in that the operating temperature is selected at the beginning of the, shoulder (20).

3. Process for bonding several elements using several types of resins or mixtures of resins according to claim 1, characterized in that it comprises several steps as a function of the number of types of resins or mixtures of resins so as to adjust the operating temperature to each type.

4. Bonding process according to claim 1, characterized in that the pressure means and means for transmission of vibrations comprise a sonotrode head (14) which is adapted to transmit vibrations and adjustable pressure force and to press the elements (10, 12) against a support element (16).

5. Bonding process according to claim 4, characterized in that the elements to be bonded are present in the form of strips flowing between the sonotrode head (14) and the support element.

6. Bonding process according to claim 4, characterized in that the sonotrode head (14) moves relative to the elements to be bonded.

7. Process for bonding several elements using several types of resins or mixtures of resins according to claim 2, characterized in that it comprises several steps as a function of the number of types of resins or mixtures of resins so as to adjust the operating temperature to each type.

8. Bonding process according to claim 2, characterized in that the pressure means and means for transmission of vibrations comprise a sonotrode head (24) which is adapted to transmit vibrations and adjustable pressure force and to press the elements (10, 12) against a support element (16).

9. Bonding process according to claim 3, characterized in that the pressure means and means for transmission of vibrations comprise a sonotrode head (14) which is adapted to transmit vibrations and adjustable pressure force and to press the elements (10, 12) against a support element (16).

10. Bonding process according to claim 8, characterized in that the elements to be bonded are present in the form of strips flowing between the sonotrode head (14) and the support element.

11. Bonding process according to claim 9, characterized in that the elements to be bonded are present in the form of strips flowing between the sonotrode head (14) and the support element.

12. Bonding process according to claim 8, characterized in that the sonotrode head (14) moves relative to the elements to be bonded.

13. Bonding process according to claim 9, characterized in that the sonotrode head (14) moves relative to the elements to be bonded.

* * * * *